(12) United States Patent
Romatier

(10) Patent No.: US 6,190,624 B1
(45) Date of Patent: Feb. 20, 2001

(54) SIMPLIFIED PLATE CHANNEL REACTOR ARRANGEMENT

(75) Inventor: Jacques J. L. Romatier, Riverwoods, IL (US)

(73) Assignee: UOP LLC, Des Plaines, IL (US)

(*) Notice: Under 35 U.S.C. 154(b), the term of this patent shall be extended for 0 days.

(21) Appl. No.: 09/149,613

(22) Filed: Sep. 8, 1998

(51) Int. Cl.$^7$ .................. B01J 8/02; B01J 8/08; F28D 9/00
(52) U.S. Cl. .......... 422/200; 422/213; 422/219; 422/220; 422/239
(58) Field of Search .................. 422/213, 219, 422/216, 218, 190, 200, 198, 196, 197, 206, 220, 239, 238, 191, 192; 165/166, 170, 167

(56) References Cited

U.S. PATENT DOCUMENTS

| 2,127,561 | * | 8/1938 | Herrmann | 422/190 |
| 3,707,831 | * | 1/1973 | Dautzenberg et al. | 55/483 |
| 3,898,049 | * | 8/1975 | Burroughs et al. | 422/190 |
| 5,130,106 | | 7/1992 | Koves et al. | 422/216 |
| 5,405,586 | | 4/1995 | Koves | 422/218 |
| 5,425,924 | * | 6/1995 | Finley | 422/220 |
| 5,525,311 | | 6/1996 | Girod et al. | 422/200 |
| 5,609,834 | * | 3/1997 | Hamada et al. | 422/196 |
| 5,700,434 | * | 12/1997 | Gaiser | 422/173 |

* cited by examiner

Primary Examiner—Shrive Beck
Assistant Examiner—Susan Ohorodnik
(74) Attorney, Agent, or Firm—John G. Tolomei; James C. Paschall

(57) ABSTRACT

The apparatus for indirectly exchanging heat with narrow channels in a heat exchange type channel reaction zone uses plates containing partially perforated sections to simplify or eliminate the use of manifolds to distribute to and collect different fluids from the various channels. The invention simplifies the operation by directly communicating adjacent channels across sections of perforations located at one end or the other of the channels. The arrangement of this invention provides the advantage of more compact heat exchanging reactor arrangements. In this manner, multiple pass channels can be contained in a single plate channel arrangement using only single or double distribution manifolds at the ends of the channels. The arrangement of the invention can also simplify the use of a single manifold arrangement at one end of the channels to facilitate catalyst unloading and catalyst replacement in the reaction channels. The different channels may provide independent flow paths for different fluids or continuous multi-pass channel flow for a single fluid.

18 Claims, 16 Drawing Sheets

SIMPLIFIED PLATE CHANNEL REACTOR ARRANGEMENT

FIELD OF THE INVENTION

This invention relates generally to plate type exchanger arrangements for containing a reaction zone and indirectly heating the reaction zone with a heat exchange fluid.

BACKGROUND OF THE INVENTION

In many industries, like the petrochemical and chemical industries, contact of reaction fluids with a catalyst in a reactor under suitable temperature and pressure conditions effects a reaction between the components of one or more reactants in the fluids. Most of these reactions it generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

Exothermic reaction processes encompass a wide variety of feedstocks and products. Moderately exothermic processes include methanol synthesis, ammonia synthesis, and the conversion of methanol to olefins. Phthalic anhydride manufacture by naphthalene or orthoxylene oxidation, acrylonitrile production from propane or propylene, acrylic acid synthesis from acrolein, conversion of n-butane to maleic anhydride, the production of acetic acid by methanol carbonylation and methanol conversion to formaldehyde represent another class of generally highly exothermic reactions. Oxidation reactions in particular are usually highly exothermic. The exothermic nature of these reactions has led to many systems for these reactions incorporating cooling equipment into their design. Those skilled in the art routinely overcome the exothermic heat production with quench or heat exchange arrangements. Extensive teachings detail methods of indirectly exchanging heat between the reaction zone and a cooling medium. The art currently relies heavily on tube arrangements to contain the reactions and supply indirect contact with the cooling medium. The geometry of tubular reactors poses layout constraints that require large reactors and vast tube surface to achieve high heat transfer efficiencies.

Other process applications accomplish indirect heat exchange with thin plates that define channels. The channels alternately retain catalyst and reactants in one set of channels and a heat transfer fluid in adjacent channels for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Many hydrocarbon conversion processes will operate more advantageously by maintaining a temperature profile that differs from that created by the heat of reaction. In many reactions, the most beneficial temperature profile will be obtained by maintaining substantially isothermal conditions. In some cases, a temperature profile directionally opposite to the temperature changes associated with the heat of reaction will provide the most beneficial conditions. For such reasons it is generally known to contact reactants with a heat exchange medium in cross flow, cocurrent flow, or countercurrent flow arrangements. A specific arrangement for heat transfer and reactant channels that offers more complete temperature control can be found in U.S. Pat. No. 5,525,311; the contents of which are hereby incorporated by reference. Other useful plate arrangements for indirect heat transfer are disclosed in U.S. Pat. No. 5,130,106 and U.S. Pat. No. 5,405,586.

Isolating reactants from coolants or heating fluids at the inlets and outlets of plate exchanger arrangements leads to elaborate designs and intricate manufacturing procedures. Many such designs increase the size of reactors by requiring manifolds and/or piping to communicate adjacent channels. Simplification of the fluid transfer between adjacent channels can also lead to simplified distribution and collection of fluids at the inlets and outlets of plate exchangers. Improved arrangements for injecting reactants at intermediate locations along the flow path through channels can also improve reactor performance.

Channel reactor arrangements often retain particulate catalyst. When the catalyst deactivates replacement of the catalyst becomes necessary. Complicated manifold arrangements for the distribution and collection of heat exchange fluids and reactants can make catalyst change out cumbersome and time consuming.

It is, therefore, an object of this invention to simplify a plate exchanger design for the indirect heat transfer and injection of reactants in the reaction zone.

It is a further object of this invention to simplify the feed and recovery of reactants and heat exchange fluid from a heat exchange reactor that uses a channel arrangement.

Another object of this invention is to make channel reactor arrangements more compact and to simplify integration of flow channels with manifolding.

A yet further object of this invention is to move reactants or heat exchange fluid in multiple passes through a channel reactor arrangement with a reduced number of manifolds.

A still further object of this invention is to facilitate the loading and unloading of catalyst from channels in a channel reactor arrangement.

BRIEF DESCRIPTION OF THE INVENTION

This invention provides sections of perforations in plates defining channels for the indirect heat exchange between fluids in a plate reactor arrangement. The sections of perforations extend over only portions of the plates defining the channels to allow communication of fluid between adjacent channels while maintaining a substantial channel length over which reactants or heat exchange fluids may pass on their way through the reactor. The partial sections of perforations located at one end of the perforated plates allow any number of channel passes to be made by a single fluid stream through the plate channel reactor. Pressure drop and heat exchange requirements pose the only practical limitation on the number of passes any one fluid may make through the channel reactor arrangement of this invention.

Suitable channel arrangements will exchange heat directly across a common heat exchange surface. The arrangements may use an isolated heat exchange stream to provide heat or cooling to reaction channels or may use a heat exchange fluid or reactant from one channel as the reactant or heat exchange fluid in an adjacent channel In particular the feed or reacted stream from the reaction channels may provide fuel for combustion and in situ heat generation in adjacent channels. Of course the heat exchange channels may also serve as combustion channels and receive fuel for combustion in isolation from the fluid in the reaction channels.

Useful arrangement may also use different portions of common channels for different functions. Such functions include passing an intermediate fluid through adjacent channels to transfer heat out of a reaction channel at one location and transfer heat back into the heated channels at a downstream channel location. In other arrangements the intermediate channels and the reaction channel may lie in a parallel arrangement between heated channels to adjust the temperature in the reaction channels through the heated channels.

Accordingly in a broad embodiment this invention is a reaction apparatus for contacting reactants with a catalyst in a reaction zone while indirectly heating or cooling the reactants in the reaction zone by indirect heat exchange with a heat exchange fluid. The apparatus comprises a plurality of spaced apart plates defining a first plurality of channels having a fluid inlet at one end and a second plurality of channels having a fluid outlet at one end. At least one section of perforations communicates fluid between the first and second plurality of channels. At least a portion of the spaced apart plates define the perforation at one of their ends with each section of perforations extending over only a portion of the plate that defines the perforations.

In particular variations of the invention, the catalyst loading within the reaction channels and the addition of catalyst for supplementary exothermic or endothermic reactions may satisfy different processing objectives. For example, short loading of catalyst in reaction channels can provide a space above or below the reaction zone for additional feed preheat or effluent cooling. Again, extending heating channels can provide additional surface area for open channel heat exchange against the exiting reaction zone effluent or the incoming reactants.

In regard to catalyst, this invention has particular advantages. The simplification or elimination of manifolds for distribution or collection of heat exchange and reactants affords space to permit the unloading of catalyst. Typically the apparatus will utilize a distribution manifold at the top of the reaction apparatus that distributes and collects fluid from the fluid inlets and fluid outlets at the top of the channels. Locating the manifold at the top makes it possible for the channels to define particle outlets at their bottoms and incorporate the catalyst unloading device. Thus, the area below the channels may be kept free from manifolds for withdrawing catalyst. The absence of any need to provide screens or other permeable surfaces at the bottom of the channels allows a simple catalyst retaining device to control retention of catalyst in the channels. The device will occlude the particle outlets when in a catalyst retention position and open the particle outlets when in an unloading position. Therefore, the channels may remain completely open for catalyst withdrawal when doors or other suitable closures are removed from the bottom of the channels. It is also possible by the simplification of this arrangement to continue fluid flow through the channels while allowing on stream removal and replacement of catalyst particles.

With respect to fluid flow in general the perforated plate section will dictate the direction of fluid flow. Adjacent channels connected by the perforated plate sections will always have relative countercurrent flow between channels. Nevertheless by isolating heat exchange fluids and reactants, cocurrent flow arrangements are also possible.

The plates defining the channels for containing the reactions and heat exchange gases may have any configuration that produces narrow channels. A preferred form of the heat exchange elements is relatively flat plates having corrugations defined therein. The corrugations serve to maintain spacing between the plates while also supporting the plates to provide a well supported system of narrow channels. Additional details on the arrangement of such plates systems are shown in U.S. Pat. No. 5,525,311; the contents of which are hereby incorporated by reference.

The invention is useful in heat producing reactions or heat absorbing reactions. One process that can advantageously use the arrangement of this invention is the production of ethylene oxide. A particularly beneficial process application for this invention is in the production of phthalic anhydride (PA) by the oxidation of orthoxylene. The reaction apparatus feeds the orthoxylene feed to a distribution manifold that injects a controlled amount of oxygen in admixture with the orthoxylene. Injection of the oxidation compound into the manifold prevents the presence of the orthoxylene and oxygen in explosive proportions. The plate arrangement of the heat exchange reactor quickly dissipates the high heat of reaction associated with the synthesis of the PA. The enhanced temperature control improves product selectivity while also permitting increased throughput.

Additional embodiments, arrangements, and details of this invention are disclosed in the following detailed description of the invention.

DETAILED DESCRIPTION OF THE INVENTION

Figure 1:
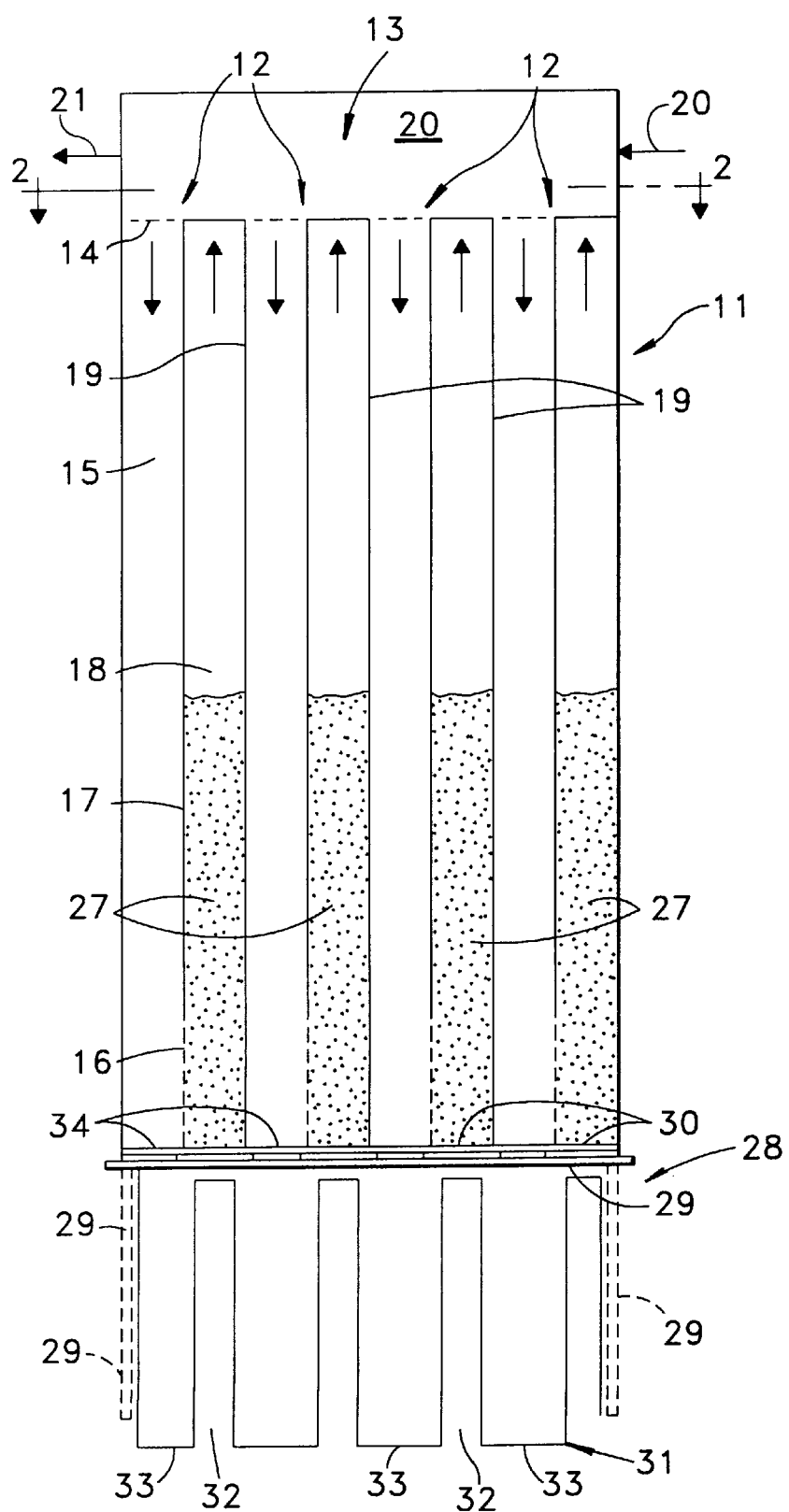
FIG. 1 is a schematic illustration of a reactor arrangement of this invention.

This invention may be useful in any endothermic or exothermic process where a reactant or a portion of a reactant provides a heat source for heating an endothermic reaction or a heat sink for cooling an exothermic reaction in an arrangement of plate exchanger elements. Additional requirements for the compatibility of any process with a plate exchanger arrangement are typically relatively low differential temperature ($\Delta T$) and differential pressure ($\Delta P$) between any heat exchange zone and reaction zone. Differential temperatures of 200° C. or less are preferred for this invention. Differential pressures will remain low and typically reflect pressure drop requirements through the catalyst bed. Ordinarily the differential pressure across plate elements will not exceed 0.5 MPa.

At least the reaction channels will usually contain a catalyst for promoting the reaction. Suitable catalysts for the previously mentioned processes as well as other process applications are well known to those skilled in the art. Catalyst in a particulate form may fill the reaction channels as necessary for reaction time and any pre-reaction heating or post-reaction cooling in the reaction channels. As an alternate to a particulate catalyst, the catalyst may also be coated on the surface of the plates in the various reforming zones. It may be particularly advantageous to coat the reaction catalyst onto the plates to provide an upper catalytic section and a lower catalyst-free section that is maintained in heat exchange relationship across the channel defining plates with a secondary catalytic zone.

The heat exchange fluid used in the process or apparatus of this invention may be any type of fluid that can provide the necessary cooling or heating capacity. A wide variety of heat exchange fluids may satisfy the requirement for heating or cooling. Such fluids will include integral process streams as well as auxiliary fluids. The fluid may absorb or release heat by sensible, latent or reactive means. For highly exothermic processes, molten salts or metals may be particularly useful as a heat exchange medium.

Where suitable for balancing heat requirements of a particular reaction, those skilled in the art are aware of particular catalysts for promoting complimentary exothermic and endothermic reactions. Such catalysts may advantageously reside in the heat exchange channels to provide reactive cooling as well as cooling from the sensible or latent heat of the reactants. An example of such an endothermic and exothermic catalyst combination is autothermal reforming of a light hydrocarbon, typically methane, to provide what is generally referred to as "synthesis gas" or "syn-gas". Synthesis gas substantially consists of hydrogen and carbon monoxide, lesser amounts of carbon dioxide, unconverted hydrocarbons, and other components which may include nitrogen and other inert components. The strongly exothermic reforming reaction is efficiently balanced against a strongly exothermic oxidation reaction that may be effected by partial catalytic or thermal oxidation of the hydrocarbons. Varying the mols of hydrocarbon in either the reforming or oxidation reaction serves to balance the heat released and the heat absorbed.

Such an arrangement is particularly suited for incorporation into a multiple pass channel arrangement that interconnects only two pairs of adjacent channels and places an exothermic reaction channel between alternate heating channels and endothermic reaction channels. In a configuration providing a three pass arrangement the relatively cold reactants flow into the heating channels where indirect heat exchange with the reaction channels provides the respective heating and cooling. Flowing the reacted stream from the exothermic reaction channels into the endothermic reaction channels provides additional cooling to the reaction channels across the shared plates that define the endothermic reaction channels as well as the adjacent exothermic reaction channels.

FIG. 1 illustrates a basic reactor arrangement for this invention. In this arrangement, a reactor 11 contains a single group of channel pairs 12. Imperforate plates 19 separate the pairs of heat exchange channels into downflow channels 15 and upflow channels 18. A manifold 13 delivers the entering fluid into inlets 14 of downflow channels 15. Perforated sections 16 defined in the bottom of the perforated plates 17 deliver the fluid to upflow channels 18.

Figure 2:
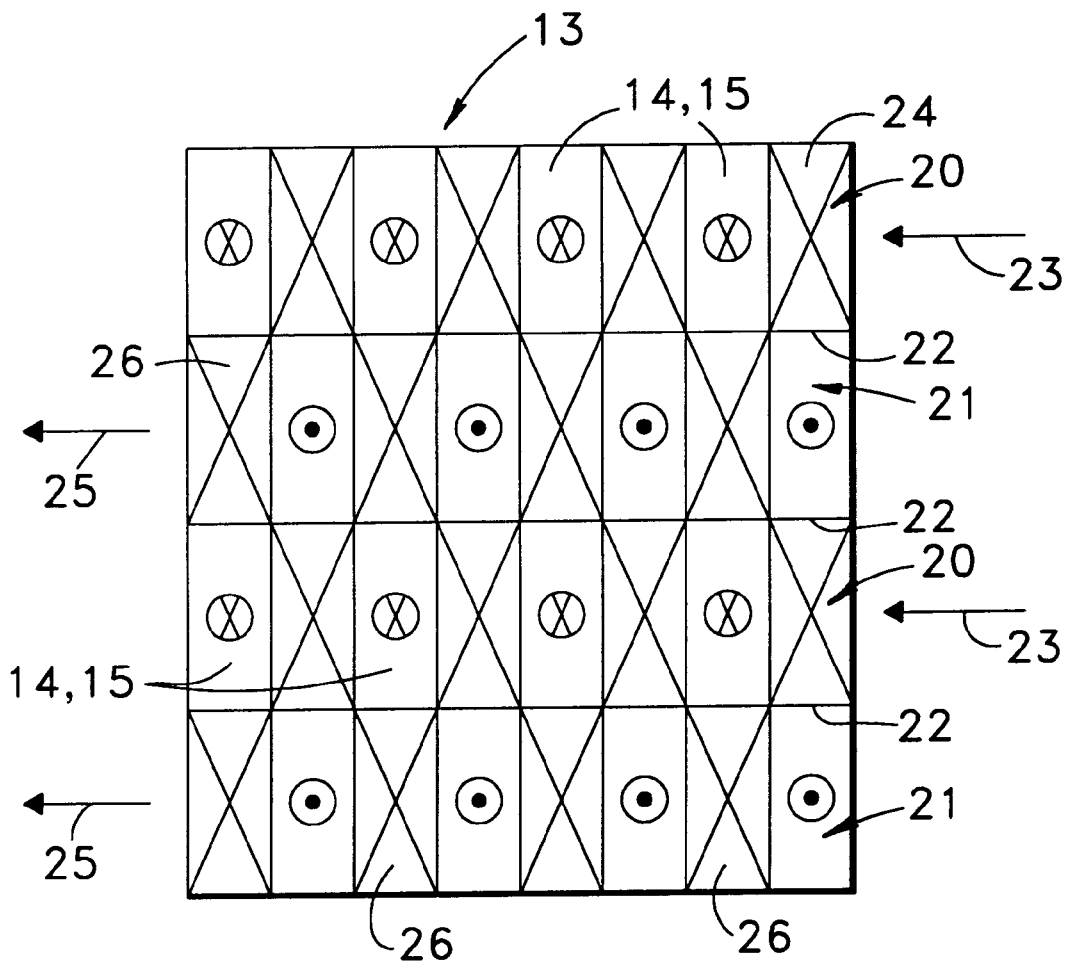
FIG. 2 is a section of FIG. 1 taken at line 2—2.

Manifold 13 contains inlet chambers 20 and outlet chambers 21 as shown in FIG. 2. Partition plates 22 segregate the volume of inlet chamber 20 and outlet chamber 21. As indicated by the ⊗ symbol, incoming fluids flow from line 23, along inlet chamber 20 down inlets 14 into channels 15. Blankoff sections 24 of upflow channels 18 prevent fluid carried by inlet chamber 20 from flowing into the upflow channels 18. Similarly, outlet chambers 21 collect the fluid from the upflow channels 18 as indicated by the ⊙ symbols for withdrawal by outlet streams 25 while blankoff sections 26 prevent outflow of fluid from the channels 15 into outlet chamber 21.

Channels 15 and 18 may serve a number of different functions. Channels 15 may provide cooling by preheating reactants for an exothermic reaction that takes place in channels 18. Conversely, channels 15 may receive a heated reactant stream that provides additional heat input for an endothermic reaction that takes place in channels 18. Alternately, channels 15 may contain an oxidation catalyst for combustive heating of reactants that enter channels 18. Those skilled in the art are aware of a variety of different catalysts and functional purposes that the perforated section 16 can be used with and for when connect the channels.

The channels of this invention are particularly suited for use with particulate catalyst. FIG. 1 shows one catalyst loading arrangement for an exothermic reaction. The cold incoming reactants enter via line 23 and pass downwardly into channels 15. As the entering reactants pass through the upper part of channels 15, the upper part of channels 18 serve as a heat exchange zone to preheat the entering feed against the exiting reactants. The exiting reactants have been heated by the exothermic reaction that takes place in the lower portion of channels 18. As the reactants pass into the lower portion of channels 15, they receive further heating directly opposite the exothermic reaction taking place in the lower portions of channel 18. As the heated reactants pass through the perforated section 16 at the bottom of perforated plate 17, they pass into catalyst particles 27 that partially fill the bottoms of channels 18. The perforations on partition 16 are sized to block the passage of catalyst particles from channels 18 into channels 15 while permitting flow of reactant fluids from channels 15 into channels 18.

The arrangement of FIG. 1 is particularly suited for changing out catalyst in channels 15, 18, or both. In the particular arrangement show in FIG. 1, catalyst 27 only resides in the channels 18 that are used for the exothermic reaction. Once catalyst 27 has deactivated or needs replacement, a catalyst unloading device, shown generally at 28, will permit unloading of the catalyst from channels 18. At minimum, the unloading device can consist of a single set of doors 29 that at least block the bottoms 30 of channels 18 to prevent catalyst from dropping out of the channels when the doors 29 are in a closed position—as shown by the solid lines. Moving doors 29 to the open position—as shown by the dashed lines—opens bottoms 30 of channels 18 for discharge of catalyst particles.

Unloading device 28 may further incorporate a secondary set of doors for selectively retaining and unloading catalyst from channels 15. The second set of doors 31 is shown in an open catalyst unloading position. Secondary doors 31 have slots 32 separating sealing fingers 33. When door 31 is swung upward across the bottoms 34 of channels 15, sealing fingers 33 block bottoms 34 of channels 15 to prevent any catalyst discharge. Slots 32 allow catalyst in channels 18 to flow around second doors 31 for complete unloading prior to unloading catalyst from channels 15 by moving doors 31 to the open position as shown in FIG. 1. Once catalyst has been emptied from channels 18 opening doors 31 permits catalyst to flow out channels 18 without any intermixing of the different catalyst particles.

Catalyst is readily loaded into channels 18 and, optionally, channels 15 from the top of reactor 11. For catalyst loading, manifold 13 can be removed from the top of the channels to expose the open areas of the channels and inlet and outlet chambers 20 and 21, respectively. When only utilizing catalyst in channels 18, fixed screens may cover inlets 14 of the channels 15 to prevent particles from flowing therein. When catalyst loading occurs over both channels, an appropriate slotted plate may be incorporated and placed over the tops of channels 15 and 18 to selectively block the channels not receiving catalyst during a particular cycle in the loading operation.

It is also possible to move catalyst while circulating reactants or heat exchange fluid through the reactor 11. The inlet and outlet chambers 20 and 21 may provide a distribution space for dispersion of catalyst over the tops of the channels that remain open in each particular chamber. In such an arrangement, a chamber or series of chambers may replace the doors 29 and 31 to provide an unloading device in the form of collection chambers for receiving particulate material. Suitable collection chambers may have an arrangement similar to that shown in FIG. 2 for gathering catalyst from selected channels. Regulated withdrawal and addition of catalyst from the top and bottom of reactor 11 can provide any desired catalyst level within the reactor.

As stated previously the invention relies on relatively narrow channels to provide efficient heat exchange across the thin plates. In general, the channel width should be less than one inch on average with an average width of less than ½ inch preferred. Suitable plates for this invention will comprise any plates that allow a high heat transfer rate. Thin plates are preferred and usually have a thickness of from 1 to 2 mm. The plates are typically composed of ferrous or non-ferrous alloys such as stainless steel. Preferred alloys for the plates will withstand extreme temperatures and contain high proportions of nickel and chrome. The plates may be formed into curves or other configurations, but flat plates are generally preferred for stacking purposes. Again each plate may be smooth and additional elements such as spacers or punched tabs may provide fluid turbulence in the channels.

Preferably each plate has corrugations that are inclined to the flow of reactants and heat exchange fluid. The corrugations maintain a varied channel width defined by the height of the corrugations. In the case of corrugations, the average channel width is most practically defined as the volume of the channels per the cross-sectional area parallel to the primary plane of the plates. By this definition corrugated plates with essentially straight sloping side walls will have an average width that equals half of the maximum width across the channels.

Figure 3:
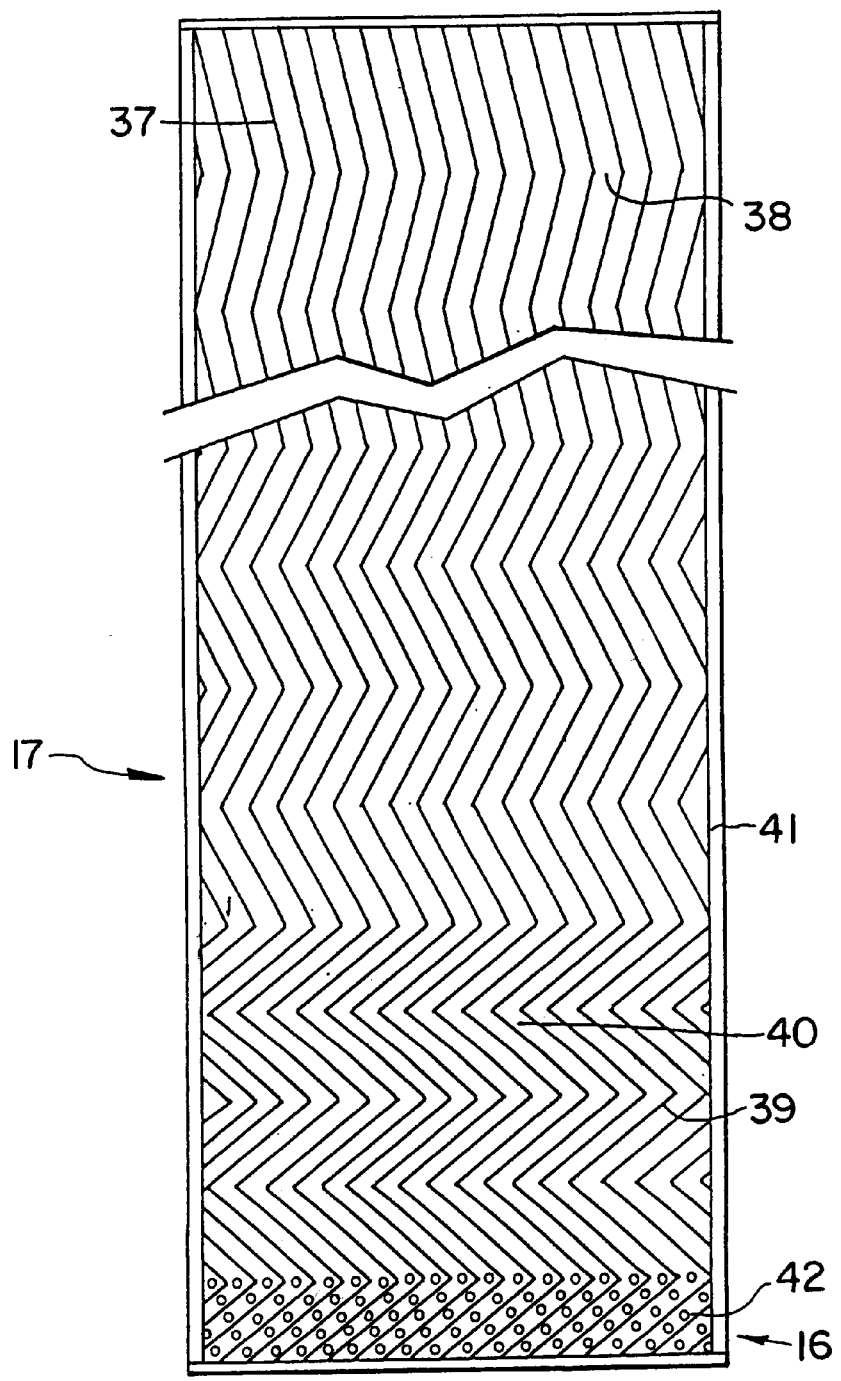
FIG. 3 is a cross-section of a perforated plate of this invention.

FIG. 3 shows the preferred corrugation arrangement for the plates 17 that divide channels 15 and channels 18. The corrugation pattern can serve at least two functions. One function is to structurally support adjacent plates. The other finction is to promote turbulence for enhancing heat exchange efficiency in the narrow reaction channel. FIG. 3 shows corrugations defined by ridges 37 and valleys 38. The frequency or pitch of the corrugations may be varied as desired to promote any varying degree of turbulence. Therefore, more shallow corrugations, with respect to the fluid flow direction, as shown by ridges 37 and valleys 38 will produce less turbulence whereas a greater corrugation pitch with respect to the direction of fluid flow, as shown by ridges 39 and valleys 40, provide increased turbulence where desired. The pitch of the corrugations and the frequency may also be varied over a single heat exchange channel to vary the heat transfer factor in different portions of the channel. Preferably, the channels may contain a flat portion 41 about their periphery to facilitate closure of the channels about the sides and tops where desired. Except for perforations, plates 19 are essentially the same as plates 17 and preferably contain corrugations and may vary the pitch of the corrugations to vary turbulence and flow factors for heat exchange and other purposes as desired.

Perforation section 16 extends across plate 17. Perforations 42 normally have a relatively small diameter that permits the fluid flow across the perforated section but prevents catalyst migration through the perforated section. The perforations will usually vary in size from about 1.5 mm to about 10 mm. Perforation section 16 could be located in an intermediate portion of a plate to provide fluid bypassing in particular process applications, but will normally have a position at one end of the plates. Positioning the corrugation at one end of the plates maximizes the fluid flow path through the channels. The flow area provided by the perforated section will usually at least equal the net flow area along the channel flow path. When one of the channels contains particulate catalyst material, the net flow area would consist of the average open area between the catalyst particles across the transverse section of the channels 18. In most cases the extent of perforations will be less than half the channel length and, typically, less than 25% of the channel length. Preferably, the perforated section of the channel will extend no more than 10% of its length in order to maximize the fluid flow path along the channel.

Figure 4:
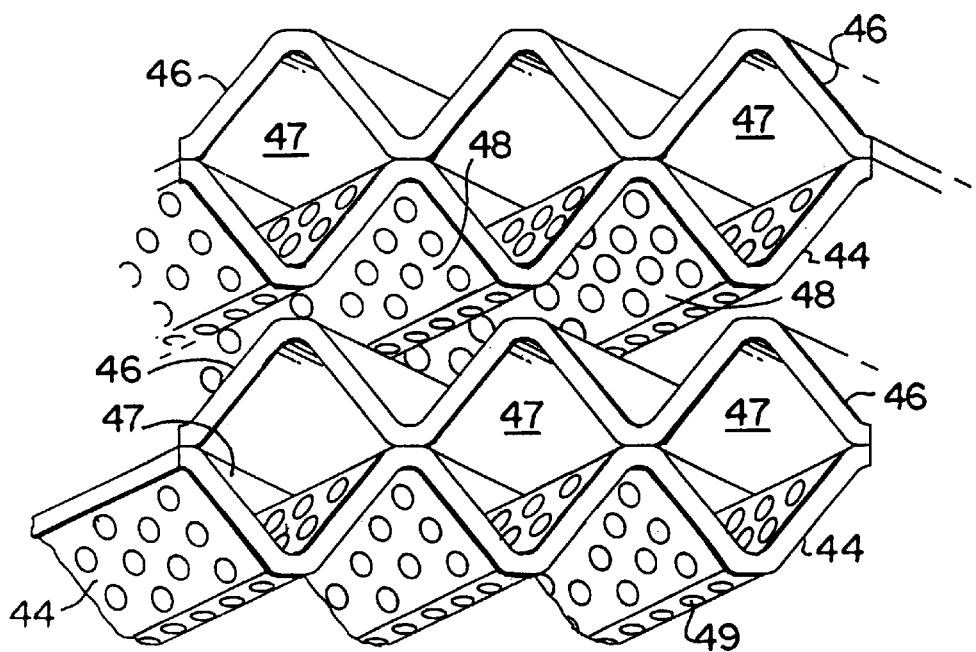
FIG. 4 is a three dimensional view of a corrugated plate section used in this invention.
Figure 5:
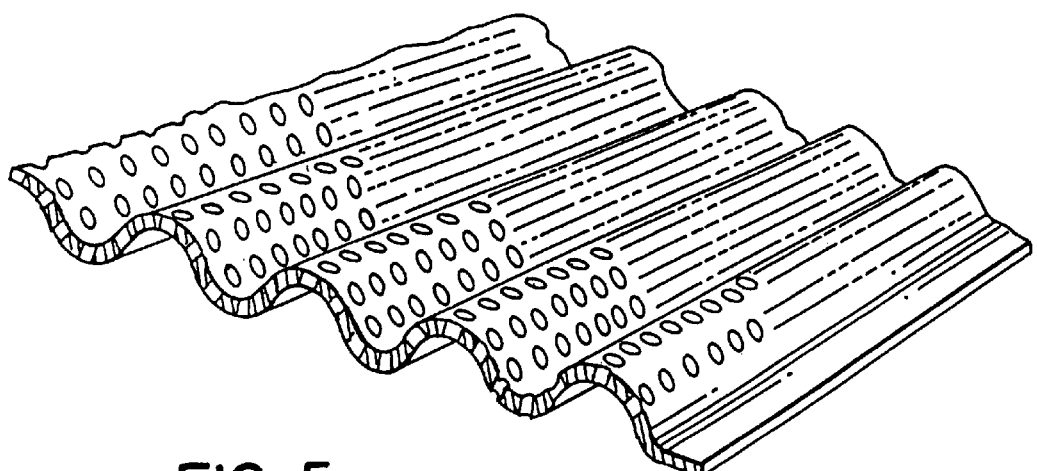
FIG. 5 is a view of single corrugated sheet containing a section of perforations.

FIG. 4 shows a typical cross-section of a corrugated plate arrangement wherein the corrugations of plates 44 extend in an opposite direction to the corrugations of plates 46 thereby defining alternate channels 47 and 48. Holes 49 provide the perforations of this invention through plates 44. FIG. 4 illustrates the preferred arrangement of corrugated plates where the herringbone pattern on the faces of opposing corrugated plates extends in opposite directions and the opposing plate faces contact each other to form the flow channels and provide structural support to the plate sections. FIG. 5 further illustrates another possible plate configuration.

It is not necessary to the practice of this invention that each reaction channel be alternated with a heat exchange channel. Possible configurations of the reaction section may place two or more heat exchange channels between each reaction channel to reduce the pressure drop on the heat exchange medium side. Double channel arrangements may be defined by a perforated plate that separates adjacent heat exchange channels and that contains perforations over its entire surface. The use of packing or perforated plates can enhance heat transfer with the reaction channels while providing good circulation over the entire cross-section of the heated channel.

Figure 6:
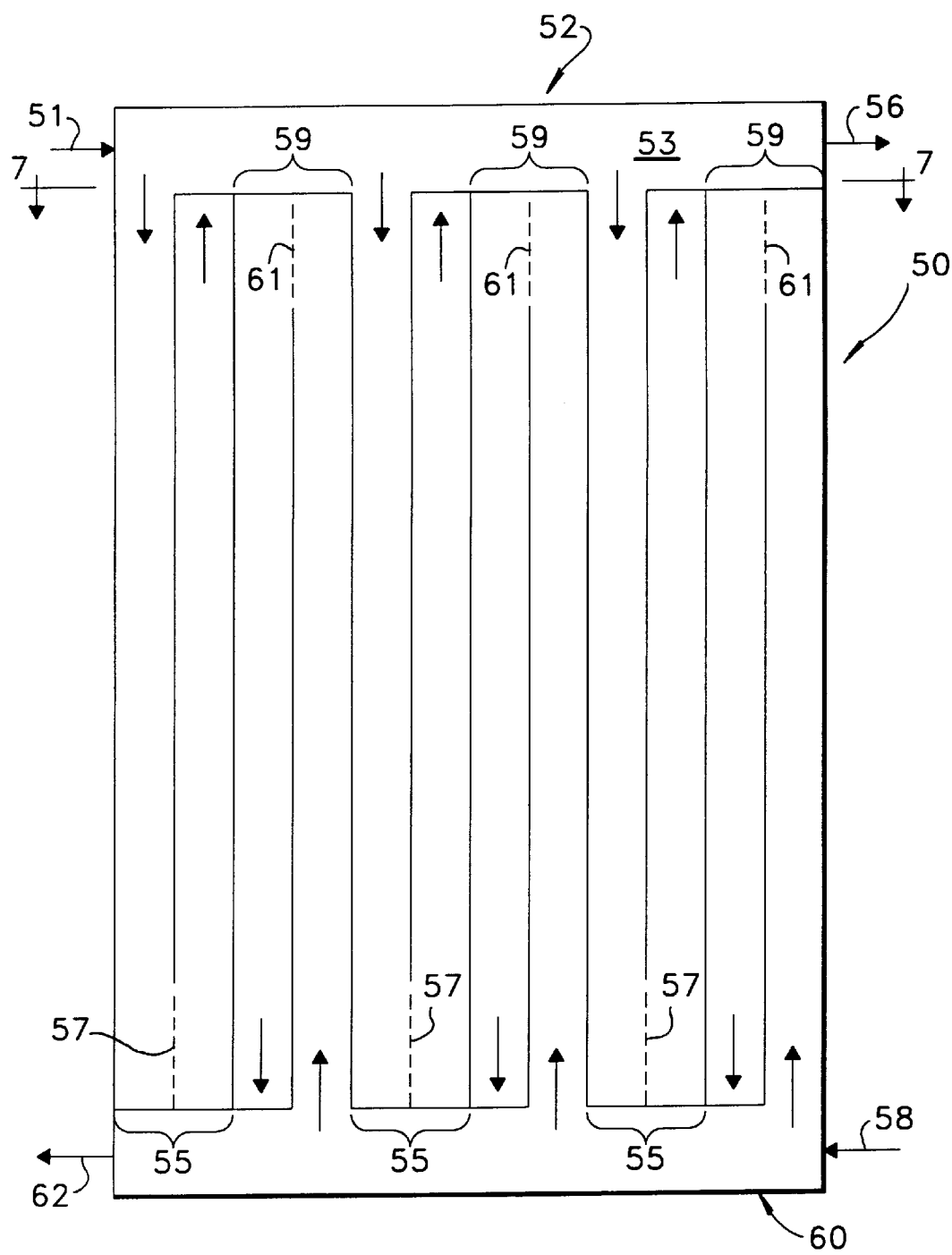
FIG. 6 is a cross-sectional view schematically showing a reactor arranged in accordance with this invention.
Figure 7:
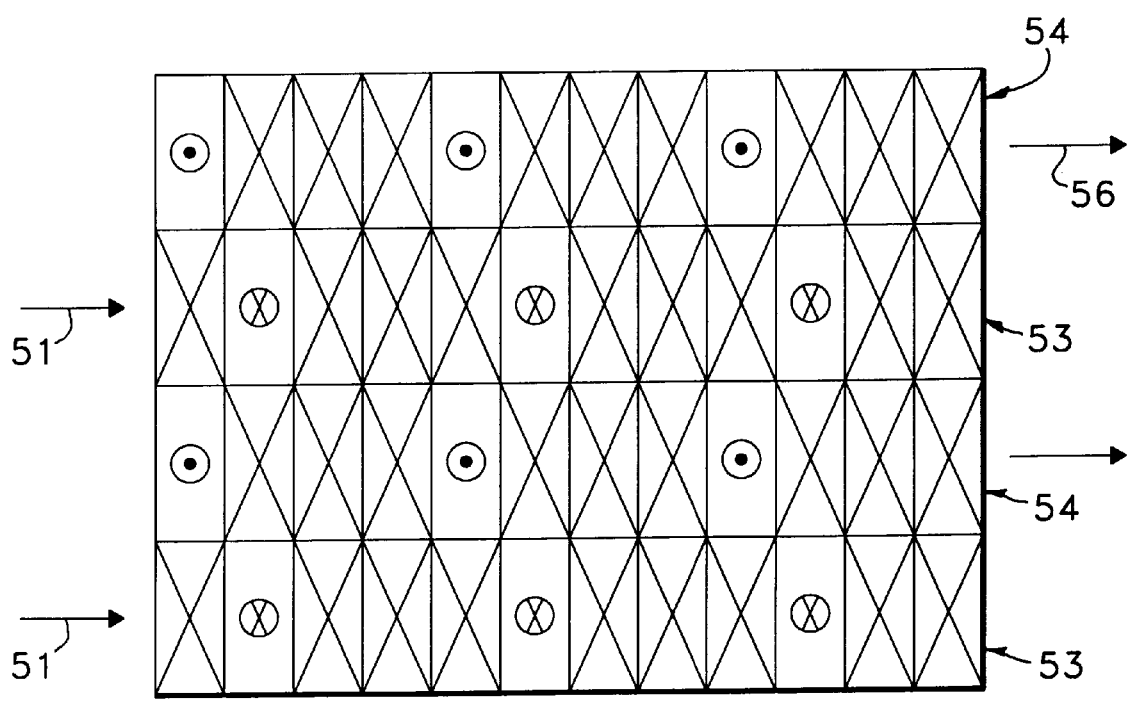
FIG. 7 is a section of FIG. 6 taken at line 7—7.

FIGS. 6 and 7 show an arrangement where two independent groups of channel pairs circulate different fluids in isolation from opposite ends of a reactor arrangement 50. An inlet stream 51 supplies fluid to a manifold arrangement 52 having upper inlet chambers 53 and upper outlet chambers 54. Inlet chamber 53 distributes upper inlet stream 51 to channel pairs 55 as shown by the ⊗ symbol. Upper outlet stream 56 collects fluid from the first group of channel pairs 55 through upper outlet chambers 54 in the channel openings indicated by the ⊙ symbol. A perforated section 57 connects the two channels in the first group of channel pairs 55. Similarly, a lower input stream 58 is distributed to a second group of channel pairs 59 via a manifold arrangement 60. An upper perforated section 61 in the second group of channel pairs 59 communicates the channels for withdrawal of a lower outlet stream 62 via manifold 60.

By this arrangement, two different fluids may be circulated in the heat exchange reaction in a complete cross-flow relationship using simple manifold arrangements at the opposite ends of the reactor arrangement. In this way, the first group of channel pairs can define heat exchange channels for circulating a heat exchange fluid and the second group of channel pairs can define reaction channels for receiving a reactant stream and delivering a reacted stream.

Figure 8:
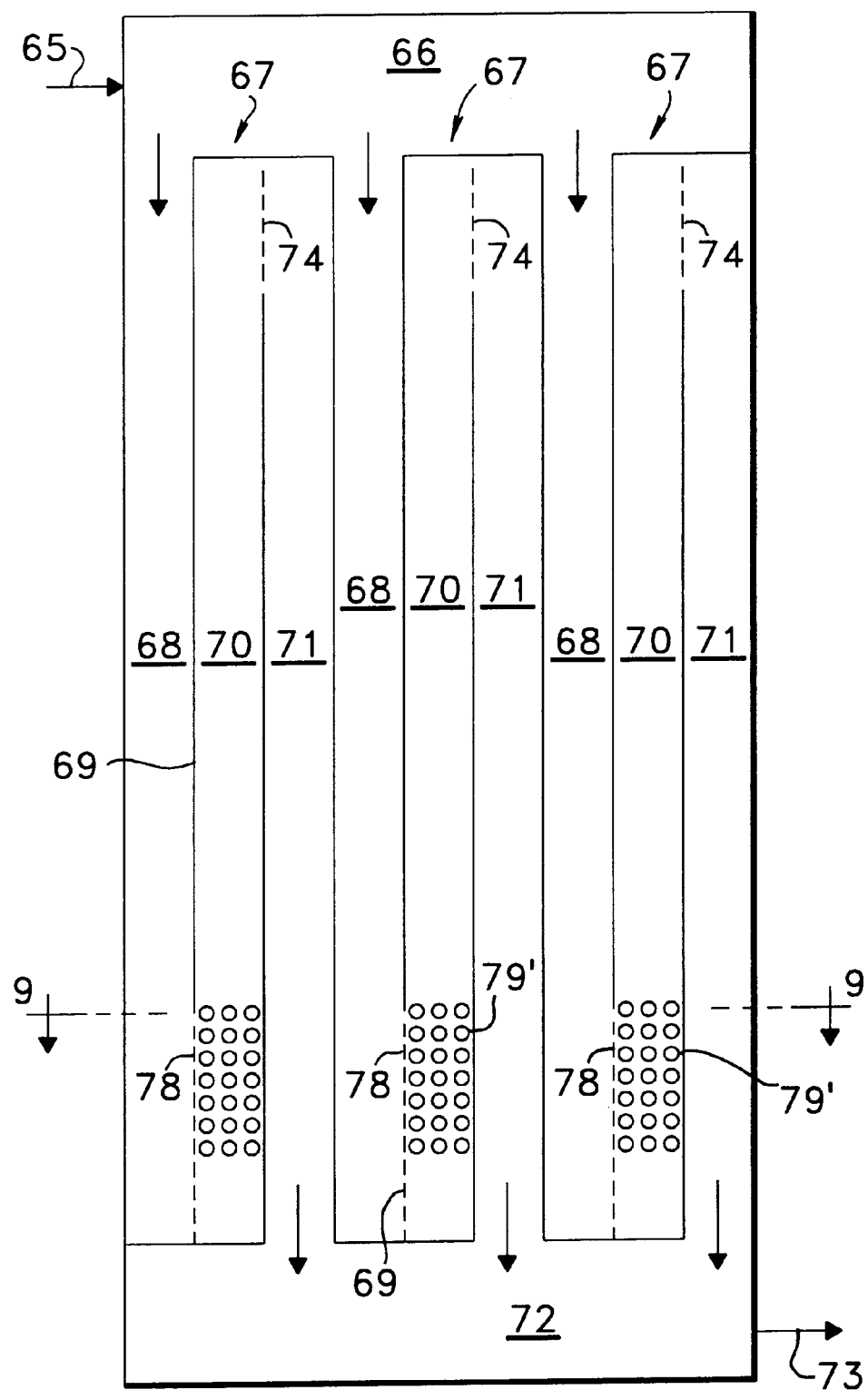
FIG. 8 is a cross-section showing a schematic arrangement for an alternative embodiment of the reactor of this invention.
Figure 9:
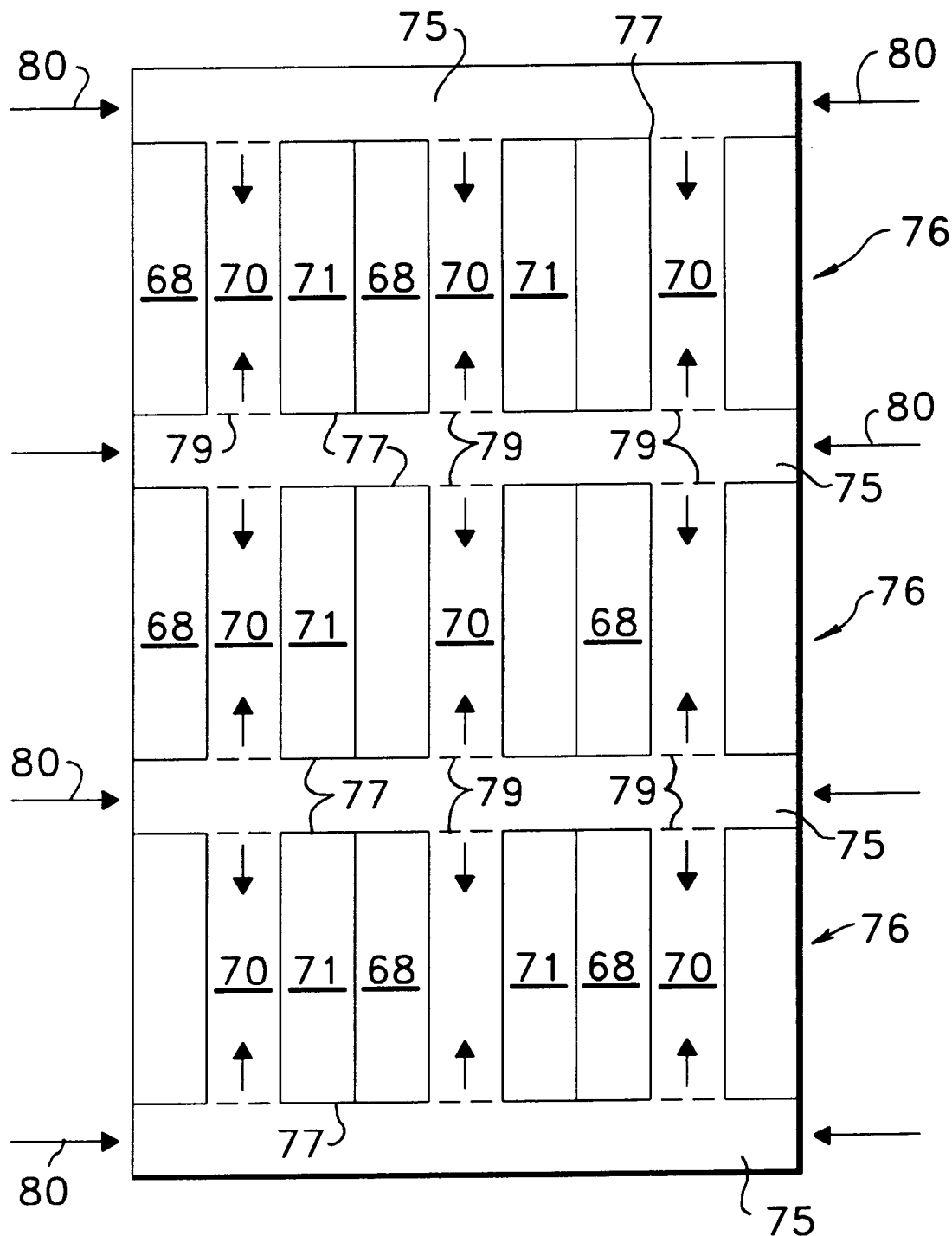
FIG. 9 is a section of FIG. 8 taken at line 9—9.

FIGS. 8 and 9 show an arrangement of reaction channels that uses an odd number of passes to provide a simplified inlet and outlet manifold arrangement. In FIG. 8 an inlet stream 65 enters an inlet manifold 66 having a single chamber. Fluid entering inlet manifold 66 flows downwardly into inlet channels 68 of a series of three pass channel arrangements 67. Perforated sections 78 at the bottom of plate 69 pass the fluid from inlet channel 68 to middle channel 70 and an upper perforated section 74 continues the communication of fluid from middle channel 70 into outlet channel 71. A manifold 72, again comprising a single open chamber, collects the effluent from outlet channel 71 for withdrawal by an outlet stream 73. In this manner, the arrangement of FIG. 8 positions the perforated sections at alternate ends of the plates defining the channels to define a flow path that delivers the fluid at one end of the channels and collects the fluid from an opposite end of the channels.

FIG. 9 shows a further modification of the arrangement of FIG. 8 wherein side manifolds 75 extend between multiple banks 76 of heat exchange channels. Single fluids or multiple fluids may be delivered to the heat exchange channels by the manifold arrangements depicted in FIGS. 6 through 8. Side channel 75 can distribute or collect liquid from the sides 77 of one or more of the channels as defined by the spaced apart plates. For purposes of illustration, FIGS. 8 and 9 shows openings 79 in the sides of channels 70 for delivery of an intermediate stream 80. Openings 79 may extend across the entire length of the channel that communicates with the side manifolds or only a portion, as shown in FIG. 8, by holes 79'. From a practical construction standpoint, the openings in the sides of the channels may be more conveniently provided by intermittent welding on the sides of the channels rather than defining open holes.

EXAMPLES

To more fully illustrate the process and apparatus of this invention and its advantages in an exothermic process application the following examples present the calculated operation of a tubular reactor base case and channel reactor arrangements of a type that use the two independent flow paths as depicted in FIGS. 6 and 7. All of the examples show the oxidation of orthoxylene to phthalic anhydride. The numerical model uses well established kinetic data and experimentally developed heat transfer data. All of the catalytic data was based on performance parameters for a silicon carbide base material surface coated vanadiumpentoxide having a surface area of 2000 cm$^2$/g. All examples operated to keep the phthalide content in the effluent at less than 1000 ppm in the PA product. The examples also modeled the use of molten salt as the cooling medium. Comparison of the numerical model against published literature for similar modeling studies verified its accuracy.

Example 1

Figure 10:
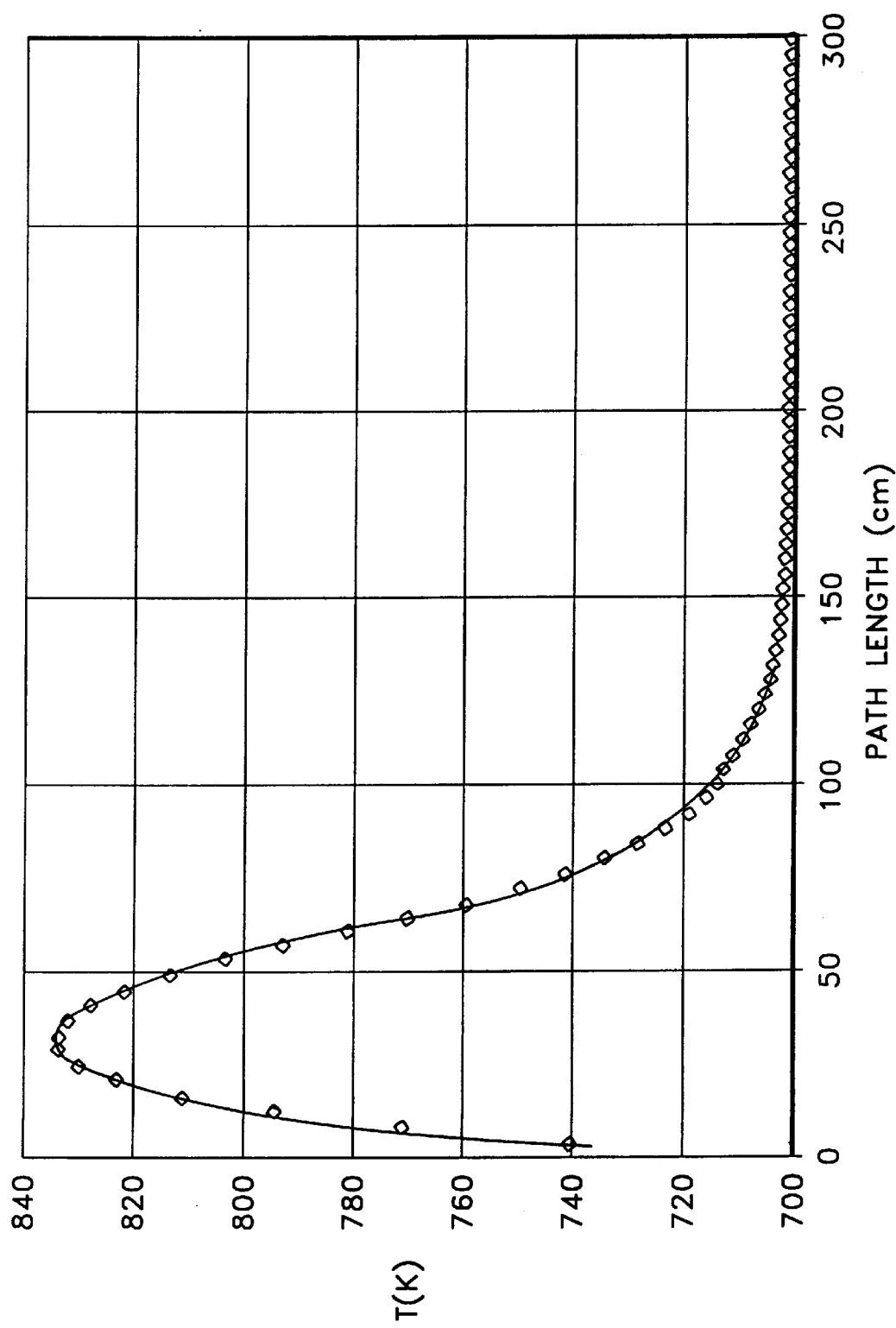
FIGS. 10 and 11 are graphs showing the temperature profile and conversion parameters along the path length of tubes in a tubular arrangement for PA production by orthoxylene oxidation.
Figure 11:
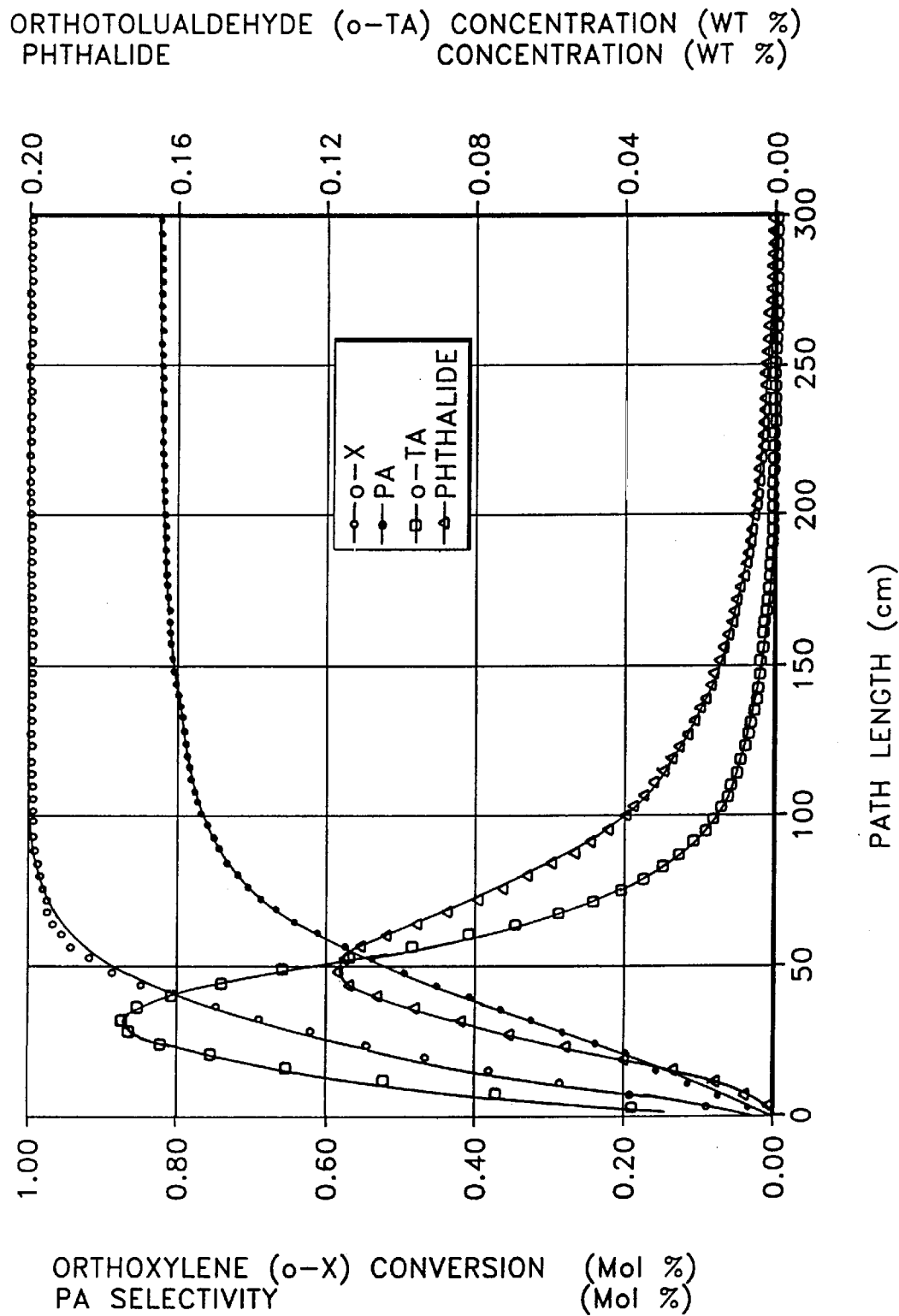

The example established the performance of the tubular reactor base case and produced similar results to current industrial tubular reactor performance. In this base case a feedstock of air containing an orthoxylene concentration of 75 g/Nm$^3$ feed passes through a three meter long tube having a diameter of 25 mm at a mass flux rate of 10,000 kg/m$^2$/hr which produces a 0.3 bar pressure drop along the tube. The tubular reactor model uses a ring shaped particle having an outer diameter of 9 mm with typically a 5 mm diameter perforation. Circulation of a salt bath at a temperature of 698° K around the shell side of the tubes provides cooling. The feed enters the tubular reactor at a temperature of about 700° K The final phthalide content in the PA product was below 1000 ppm. FIG. 10 graphically depicts the temperature profile over the length of a representative tube. The tube achieves a peak temperature of about 835° K within the first 50 cm of its path length. FIG. 11 illustrates an essentially complete conversion of orthoxylene with about the first 100 cm of tube length. As also presented by FIG. 11, continued conversion in the tubes reduces the concentration of orthotolualdehyde and phthalide to levels of less than 1000 ppm while raising the PA selectivity to about 83%.

Example 2

Figure 12:
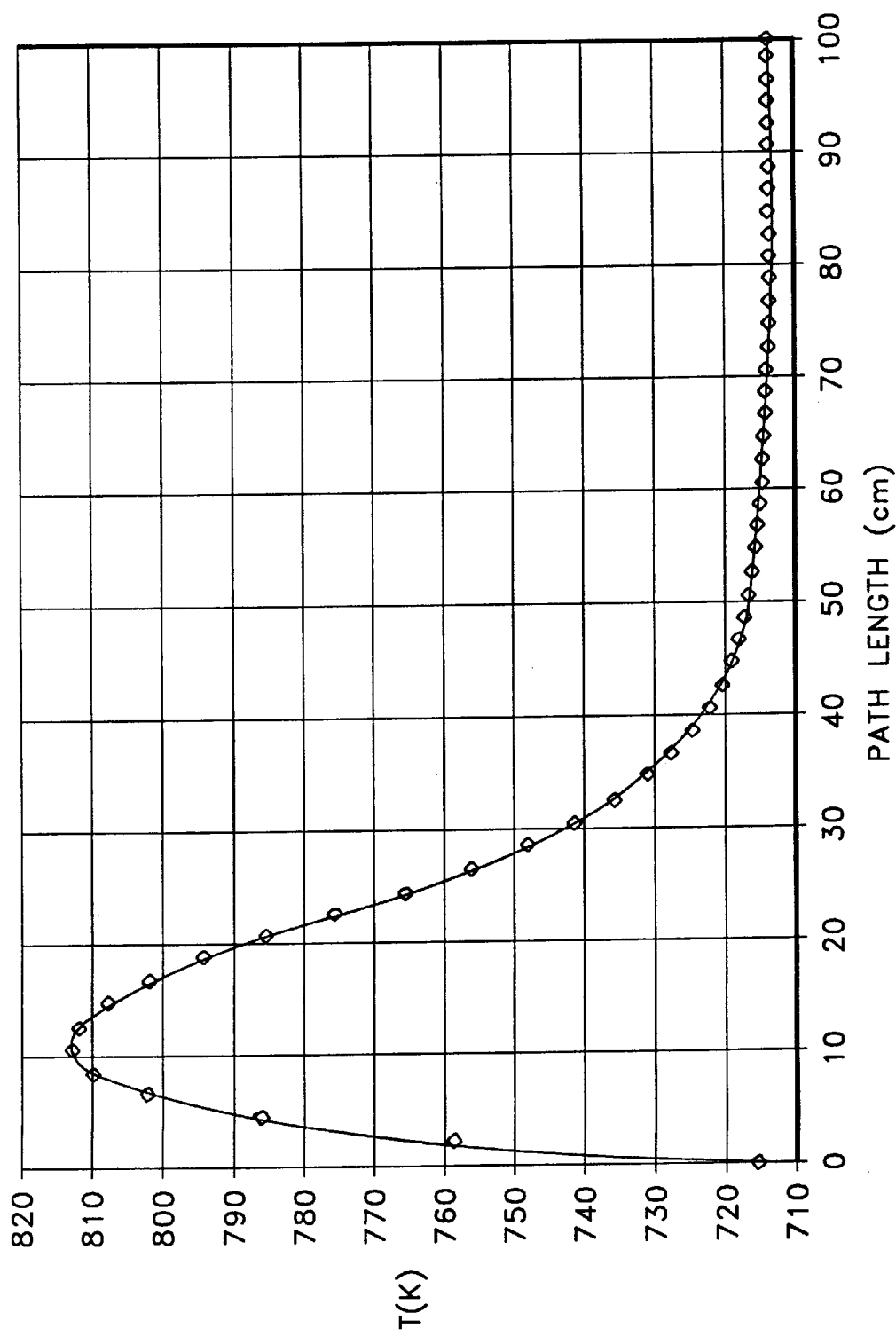
FIGS. 12 through 17 are graphs showing the temperature profile and conversion parameters along the path length of channels in plate heat exchange reactor arrangements for producing PA by orthoxylene oxidation.
Figure 13:
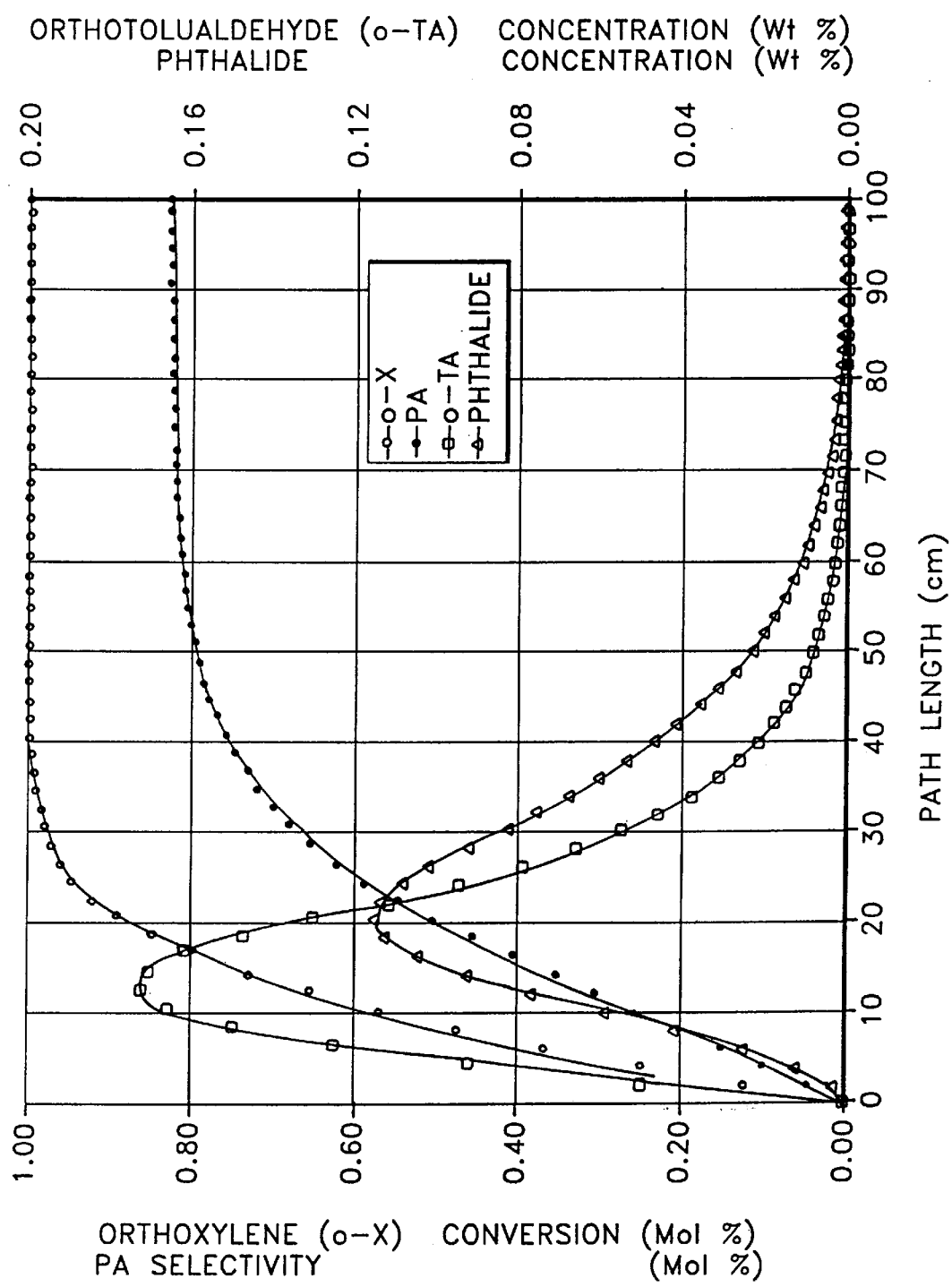

The plate heat exchanger type reactor operates at the same orthoxylene inlet concentration and mass flux through the heat exchange channels as the tubular reactor. The channel arrangement contains a 2 mm spherical catalyst in a 6 mm gap between channels in one of the channel pairs. To maintain the same 0.3 bar pressure drop across the channels as across the tubes, the process flux in the plate reactor arrangement drops to 7500 kg/m$^2$/hr. Nevertheless, the sizing of the plate exchange reactor maintains the same ratio of heat transfer surface area to catalyst surface area on a per reactor volume basis as in the tubular reactor arrangement. At the same 75 g/Nm$^3$ concentration of orthoxylene in the air feed, the process inlet temperature in the plate exchanger reactor increases 15° C. above the tubular reactor case or to a temperature of about 713° K to maintain the same phthalide level in the PA product. Even with an increased inlet temperature FIG. 12 shows the peak temperature in the channels decreasing to about 815° C., representing about a 20° C. temperature drop relative to the tubular reactor case. Again, FIG. 13 shows a rapid conversion of orthoxylene along the path length of the plate exchange reactor with about the same selectivity to PA and orthotolualdehyde and phthalide to levels below 1000 ppm. Thus, the temperature reduction of this example demonstrates that the plate heat exchange reactor has about a 30% overall greater heat transfer ability than the tubular reactor.

Example 3

Figure 14:
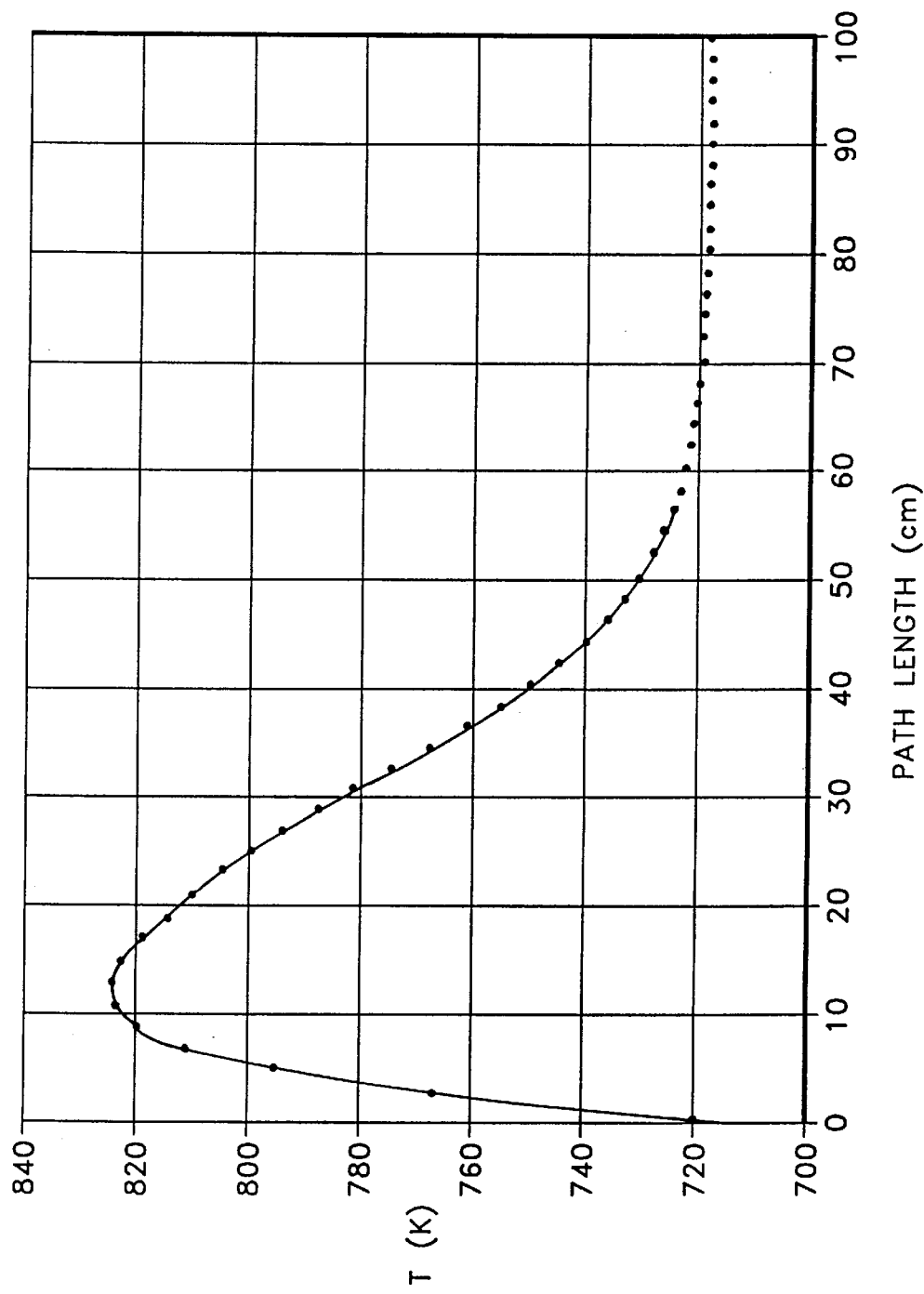

Example 3 evaluates increases in the concentration of the orthoxylene in the air to the plate exchange reactor over the range of from 75 g/Nm$^3$ to 110 g/Nm$^3$ to determine the concentration that produces the same peak temperature in the plate heat exchange reactor as in the tubular reactor. Heat from the additional orthoxylene oxidation requires increasing the circulating salt temperature from the 713° K in Example 2 to about 717° K to keep the phthalide concentration below 1000 ppm in the PA product. At a concentration level of about 105 g/Nm$^3$, the peak temperature of the plate reactor (see FIG. 14) approaches the maximum temperatures of the tubular reactor arrangement. As established by FIG. 15, the maximum orthoxylene concentration can increase significantly over the tubular case reactor by use of the plate exchanger while still maintaining the PA selectivity of about 83 mol %.

Example 4

Figure 15:
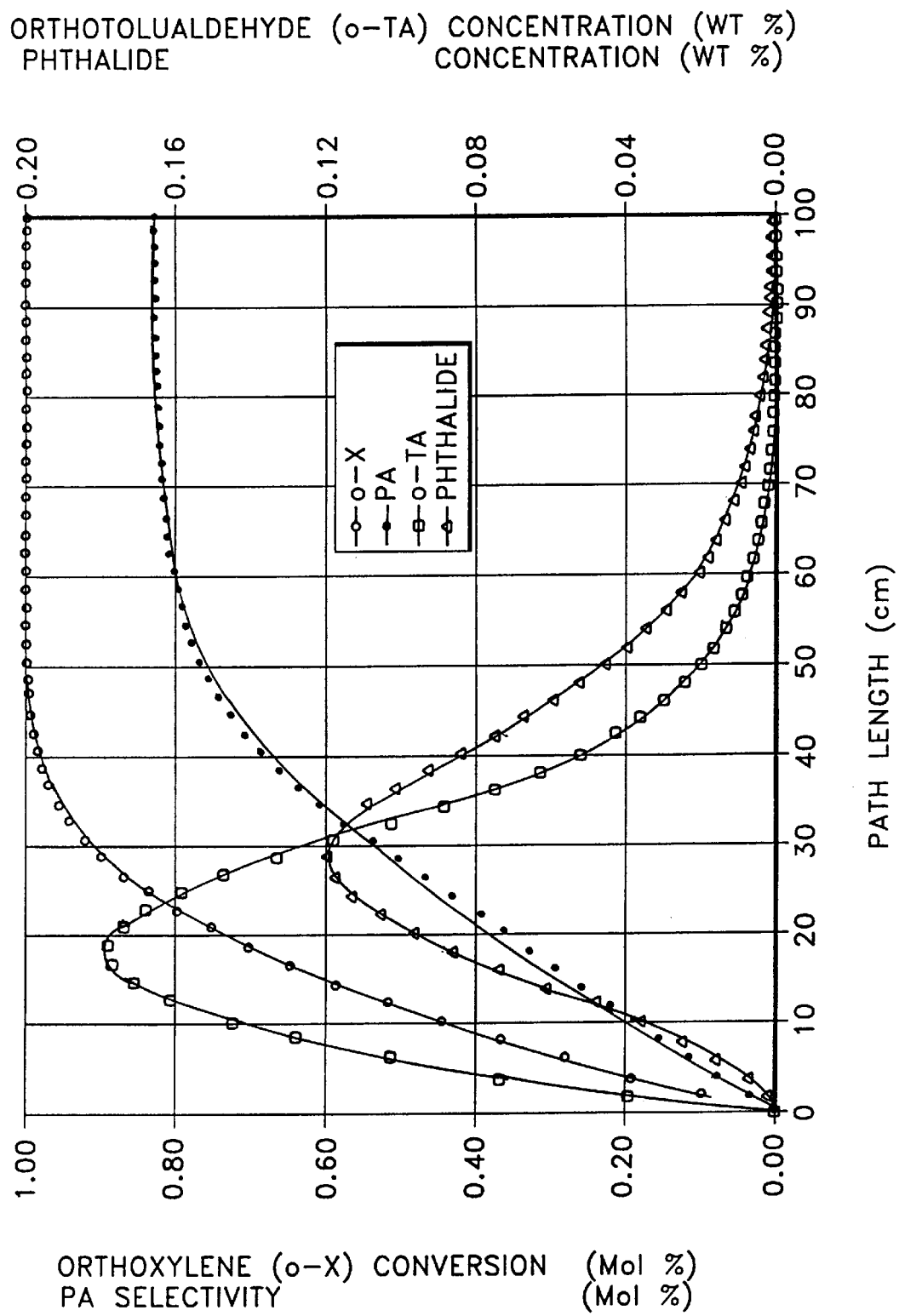
Figure 16:
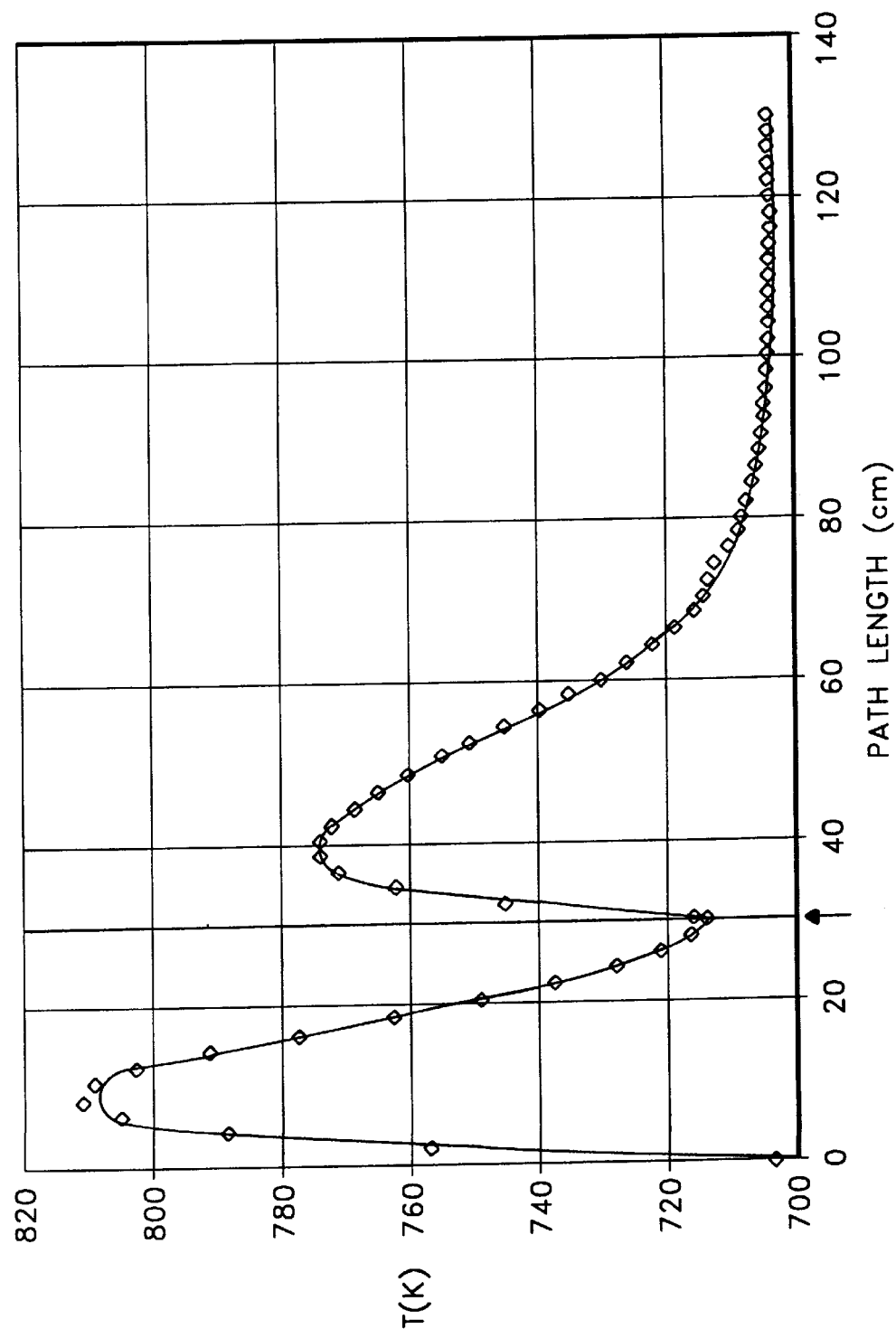
Figure 17:
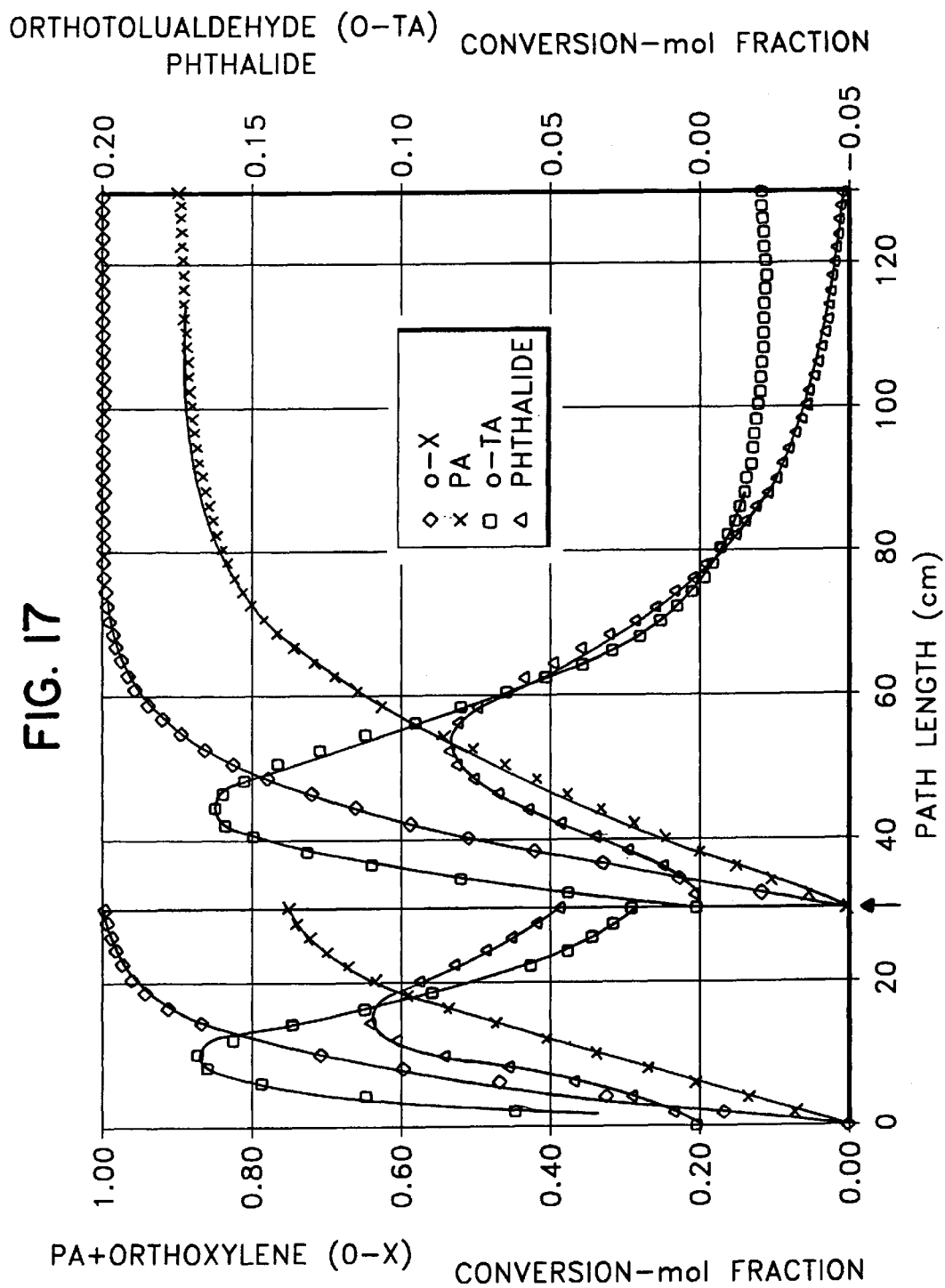

Example 4 demonstrates the effect on temperature and conversion of staging the injection of orthoxylene at an intermediate point in the channels to reestablish a maximum concentration of 75 g/Nm³. Staged injection of feed in this case would use the side distribution channels of FIGS. 8 and 9 in combination with one of the groups of channel pairs as shown in FIGS. 6 and 7. This example decreases initial injection of feed to reduce the process flux at the inlet of the plate reactor to 5525 kg/m²/hr for the first stage of orthoxylene injection. The arrangement injects additional orthoxylene at 30 cm along the path length of the heat exchange reactor in a middle section of one of the channels in each pair of the upflow and downflow channel groups. With the lower process flux, the temperature of the circulating salt bath drops to 700° K, the equivalent of the tubular reactor inlet temperature. The path length of the channels in this example increases to a total of 130 cm that provides an additional 30 cm for the first stage, while maintaining the same 100 cm of second stage that was used in Examples 2 and 3. The additional length decreases the phthalide content below 1000 ppm in the PA product. Nevertheless, even with the increased length, total pressure drop remains below the 0.3 bar value of the tubular reactor example. FIG. 15 displays a maximum peak temperature of below 810° K in the first stage. FIG. 16 shows an essentially complete orthoxylene conversion within the first 30 cm of the injection point. FIG. 17 demonstrates continued PA selectivity at over 83%. As a result, a process unit using the tubular type reactor to produce 50 kMta of PA would require 33 cubic meters of catalyst. By comparison, a plate heat exchange reactor using multiple feed injection to produce the same amount of PA product requires only about 12.8 m² of catalyst and thereby significantly reduces capital costs of the plate reactor arrangement relative to the tubular reactor arrangement. Looked at another way, this example shows an effective doubling of orthoxylene feed concentration with staged feed injection over that of the tubular reactor.

Overall the examples establish numerous process advantages of the plate reactor arrangement over the tubular reactor arrangement. A comparison of the examples shows the overall added heat efficiency of using a plate heat exchange reactor arrangement that introduces a mixture of air and othoxylene at single inlet point for the production of phthalic anhydride. Using the plate reactor arrangement with a an increasing orthoxylene concentration in the air at the single feed inlet produces additional advantages. Moreover, staged feed injection of the orthoxylene in the plate reactor arrangement substantially reduces the plate reactor arrangement costs. Such savings can include a 50% reduction in air compression costs and substantial reduction in capital costs due to a smaller relative size for plate reactor versus the tubular reactor.

What is claimed is:

1. A reaction apparatus for contacting reactants with a catalyst in a reaction zone while indirectly heating or cooling the reactants in the reaction zone by indirect heat exchange with a heat exchange fluid, the apparatus comprising:

a plurality of spaced apart plates defining a first plurality of channels having a fluid inlet at one end and a second plurality of channels having a fluid outlet at one end;

the plurality of spaced apart plates including imperforate plates for blocking fluid flow between adjacent channels with perforated plates alternating with each imperforate plate to define a continuous flow path with the fluid inlet and the fluid outlet at the same end of the first and second plurality of channels: and, at least one section of perforations to communicate fluid between the first and second plurality of channels wherein at least a portion of the spaced apart plates define perforations at one of their ends with each section of perforations extending over only a portion of the plate that defines the perforations, the perforations on the perforated plates alternating from one end of the channels to the other to define independent flow paths through first and second groups of first and second channel pairs and a first manifold at one end of the channels collecting and distributing fluid from the first group and a second manifold at the opposite end of the channels collecting and distributing fluid from the second group of first and second channel pairs.

2. The apparatus of claim 1 wherein a distribution manifold distributes and collects fluid from the fluid inlets and fluid outlets at the top of the channels, at least a portion of the channels define particle outlets at their bottoms, and a catalyst unloading device occludes the particle outlets when in a catalyst retention position and opens the particle outlets when in an unloading position.

3. The apparatus of claim 2 wherein the fluid inlets of the first set of channels and/or the fluid outlets of the second set of channels receive particles.

4. The apparatus of claim 3 wherein every other plate in the plurality of plates defines a section of perforations at its bottom to directly communicate the bottom of the first and second plurality of channels for fluid flow.

5. The apparatus of claim 2 wherein the first and second plurality of channels define particle outlets at their bottoms and the unloading device comprises a first door that opens one of the plurality of channels for particle unloading while in a first position and retains particles in the channels when in a second position.

6. The apparatus of claim 5 wherein the unloading device comprises a second door having a slotted plate configuration positioned above the first door when the second door retains particles in one plurality of channels.

7. The apparatus of claim 1 wherein the sum of the open areas defined by the perforations at least equals the net flow area of the channels.

8. The apparatus of claim 1 wherein the section of perforations extends over less than 25% of the length of a plate.

9. The apparatus of claim 1 wherein at least two perforated plates extend between each imperforate plate to define a continuous flow path that traverses at least three channel lengths.

10. The apparatus of claim 2 wherein a first manifold distributes fluid to fluid inlets at one end of the channels and a second manifold collects fluid from an opposite end of the channels.

11. The apparatus of claim 1 wherein adjacent perforated plates have the perforation sections at opposite ends.

12. The apparatus of claim 1 wherein different sides of common spaced apart plates define the first and second plurality of channels.

13. The apparatus of claim 1 wherein the first group of channel pairs defines heat exchange channels for circulating a heat exchange fluid and the second group of channel pairs defines reaction channels for receiving a reactant stream and delivering a reacted stream.

14. The apparatus of claim 1 wherein the reaction channels have an average width of less than 2.5 cm 1 inch).

15. The apparatus of claim 1 wherein the plates are flat.

16. The apparatus of claim 1 wherein the plates define corrugations and the corrugations maintain the spacing of the plates.

17. A reaction apparatus for contacting reactants with a catalyst in a reaction zone while indirectly heating or cooling the reactant in the reaction zone by indirect heat exchange with a heat exchange fluid, the apparatus comprising:

a plurality of spaced apart plates defining a first plurality of channels having a fluid inlet at one end and a second plurality of channels having a fluid outlet at one end;

at least one section of perforations to communicate fluid between the first and second plurality of channels wherein at least a portion of the spaced apart plates defines perforations at one of their ends with each section of perforations extending over only a portion of the plate that defines the perforations; and;

a side manifold extending across sides of the channels and the sides of a portion of the channels defining openings to communicate with the side manifold for distributing a fluid from or collecting a fluid into the side manifold.

18. The apparatus of claim 17 wherein the section of perforations extends over less than 25% of the length of a plate.

* * * * *